A. V. HANNIFIN.
CHUCK.
APPLICATION FILED APR. 7, 1913.

1,089,362.

Patented Mar. 3, 1914.

Witnesses:
Harry S. Gaither
Ephraim Banning

Inventor
Arthur V. Hannifin
by Banning & Banning
Attys.

UNITED STATES PATENT OFFICE.

ARTHUR V. HANNIFIN, OF CHICAGO, ILLINOIS, ASSIGNOR TO HANNIFIN MANUFACTURING COMPANY, OF CHICAGO, ILLINOIS, A CORPORATION OF ILLINOIS.

CHUCK.

1,089,362.  Specification of Letters Patent.  Patented Mar. 3, 1914.

Application filed April 7, 1913. Serial No. 759,443.

*To all whom it may concern:*

Be it known that I, ARTHUR V. HANNIFIN, a citizen of the United States, residing at Chicago, in the county of Cook and State of Illinois, have invented certain new and useful Improvements in Chucks, of which the following is a specification.

This invention relates to improvements in chucks generally, with special reference to such as are designed to be operated by an elastic medium under pressure.

It is sought in the present invention to provide positive and effective means for forcing the jaws together; to arrange each of the jaws independently adjustable with respect to the axis of the chuck; to arrange each jaw adjustable in unison with the other jaw; and to vary the range of movement of the jaws within predetermined limits.

The invention further consists in the features of construction and combination of parts hereinafter described and claimed.

Figure 1:
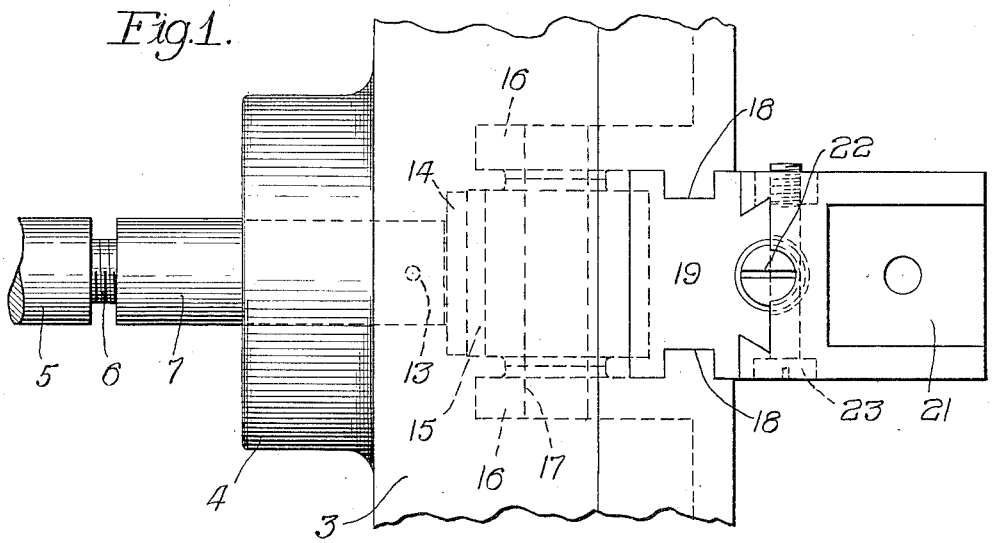
Figure 2:
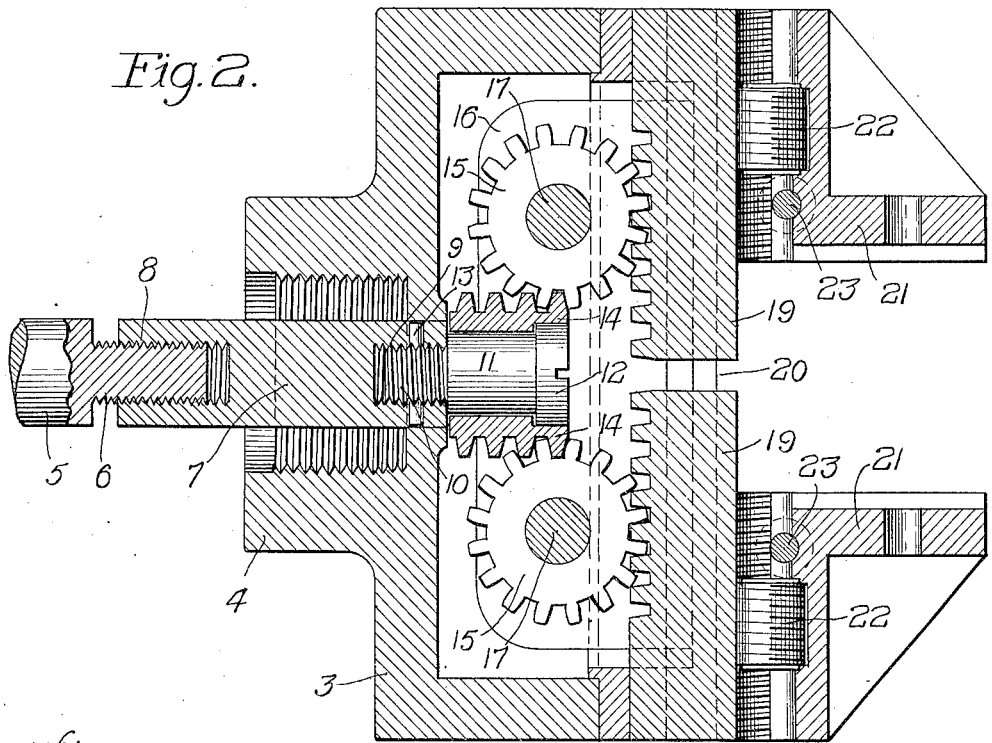

In the drawings, Figure 1 is a view in elevation of my improved chuck; and Fig. 2 is a longitudinal section taken therethrough.

The substantially cylindrical casing 3 of the chuck is provided at its rear end with an interiorly threaded boss 4 arranged to engage with the head of a lathe (not shown) to be fastened thereupon. The movement of the jaws in the present chuck is intended to be effected by the use of an elastic medium under pressure through suitable piston mechanism located at the end of the lathe, power from the said mechanism being transmitted to the chuck through the center of the head stock by means of a rod or shaft 5 formed with a threaded end 6, preferably of reduced diameter.

A stub shaft 7 enters the chuck from the rear end being provided at its outer end 8 with a socket having interiorly formed threads therein, and arranged to make an adjustable locking connection with the end 6 of the rod 5 by a threading engagement therewith. The inner end also of the stub shaft 7 is formed with a threaded socket 9 arranged to receive therein the threaded end 10 of a member 11, which is provided with a head 12; a pin 13, or other suitable device, being utilized to lock the member 11 with the stub shaft in a fixed relation. A double faced rack 14 is secured to the inner end of the stub shaft being locked thereto by the member 11, the head 12 of which is arranged to prevent longitudinal, but not rotary, movement of the stub shaft with respect to the rack.

Positioned within the chuck casing diametrically opposite the center line thereof are two pinions 15, each of which is arranged with its teeth in engaging relation to the double faced rack 14. Walls extending parallelly within the chuck casing provide bearings 16 within which the pinion shafts 17 may seat, and also guide ways 18 between which rack members 19 may slide diametrically inwardly toward or outwardly from the center line of the chuck. Between the two rack members 19, it is intended that a small opening 20 shall always be left in the line of the center of the chuck through which a suitable tool may be inserted to manipulate the member 11, as will be more fully hereinafter explained.

Each of the rack members 19 is recessed near the sides of its front face to provide an extended middle portion, the side walls of which are obliquely disposed. Jaws 21 are arranged to be locked one to each of said rack members, the engaging faces of the jaws being formed to present with the face of the rack member a dovetail connection. Each of the jaws is independently adjustable upon its rack member by means of the screw 22 which travels in a bore extending radially between the engaging faces of the rack member, which is suitably threaded, and the jaw which is formed to provide a pocket within which the screw partially seats. A tie bolt 23 serves to clamp the jaw tightly upon the rack member, being positioned substantially as is shown in Fig. 1.

The operation of causing the jaws to clamp upon the article being worked in the lathe is effected from the piston mechanism through the medium of the rod 5. A forward movement of said rod will cause the double faced rack to move within the chuck casing, thereby turning each of the pinions 15 an equal distance in opposite directions. The rack members 19 are likewise moved toward or from each other an equal distance, their limit of outward movement being determined when the head of the member 11 has traveled as far as the teeth on the rack members. A movement of the rod 5 in the opposite direction results in an entire reversal in the operation of the parts, the jaws being brought together at an equal speed toward the center line of the chuck. Provision has been made for further limiting the range of movement of each of said jaws. A suitable tool may be inserted through the opening 20 to engage with the head 12 of the member 11 to turn the same freely within the double faced rack. This movement causes the stub shaft 7 to be revolved and the relative length of the operating rods 5 and 7 to be changed. By such an adjustment the outward or inward movement of the jaws is made more limited, according to the direction in which the member 11 is turned. It is obvious that, instead of a slot as indicated, the head 12 may be provided with any suitable formation adapted for the engagement of a wrench or other tool which is employed. Each of the jaws is furthermore independently adjustable upon the rack members 19. With the loosening of the tie bolt 23, the screw 22 may be turned to bring either of the jaws nearer or farther away from the center line of the chuck, so that an operator may in this manner true the device to swing an article exactly on the center line.

I claim:

1. In a chuck, the combination of a longitudinally movable actuating rod consisting of two sections, one of said sections being formed with a threaded socket and the other with a threaded stem to engage therewith, a rack within the chuck body mounted on the end of the inner section of said actuating rod and arranged to permit rotary movement of said inner section with respect thereto, whereby the relative length of the actuating rod may be varied, pinions arranged to mesh with said rack, rack members movable substantially radially of the chuck and arranged one to mesh with each of said pinions, and jaws carried one by each of said rack members, substantially as described.

2. In a chuck, the combination of a longitudinally movable actuating rod consisting of two sections, one of said sections being formed with a threaded socket and the other with a threaded stem to engage therewith, a double faced rack mounted on the end of the inner section of said rod and arranged to permit rotary movement of said inner section with respect thereto, whereby the relative length of the actuating rod may be varied, pinions arranged diametrically within the chuck to mesh one with each face of said rack, rack members movable substantially radially of the chuck arranged one to mesh with each of said pinions, and jaws carried one by each of said members, substantially as described.

A. V. HANNIFIN.

Witnesses:
M. TULLY,
M. J. HANNIFIN.